United States Patent [19]

Telibasa

[11] Patent Number: 5,146,489
[45] Date of Patent: Sep. 8, 1992

[54] DEDICATED LINE ELIMINATOR FOR FACSIMILE/TELEPHONE SYSTEMS

[75] Inventor: Marius Telibasa, Woodside, N.Y.

[73] Assignee: IT Systems Corporation, Yonkers, N.Y.

[21] Appl. No.: 717,680

[22] Filed: Jun. 19, 1991

Related U.S. Application Data

[63] Continuation of Ser. No. 482,200, Feb. 20, 1990, abandoned.

[51] Int. Cl.$^5$ ............................................. H04M 11/00
[52] U.S. Cl. ....................................... 379/100; 379/97; 379/102
[58] Field of Search ................ 379/100, 93, 94, 96, 379/97, 98, 102

[56] References Cited

U.S. PATENT DOCUMENTS

| | | | |
|---|---|---|---|
| 4,660,218 | 4/1987 | Hashimoto | 379/100 |
| 4,663,778 | 5/1987 | Takahashi | 379/100 |
| 4,788,714 | 11/1988 | Hashimoto | 379/100 |
| 4,800,439 | 4/1987 | Yoshino | 379/100 |
| 4,910,764 | 3/1990 | Bowen | 379/100 |
| 4,942,600 | 7/1990 | Suzuki | 379/100 |

Primary Examiner—James L. Dwyer
Assistant Examiner—Wing F. Chan
Attorney, Agent, or Firm—Darby & Darby

[57] ABSTRACT

An electronic device for controlling the flow of data between a single incoming telephone line and either a facsimile machine (fax machine) or a telephone handset comprising means for detecting an incoming call, and means for immediately activating the telephone in response to the detection means detecting the incoming call thereby allowing the called party to answer the telephone before the incoming call is switched to the facsimile machine. The fax machine is disconnected from the telephone line for a predetermined period of time in response to the detection means detecting the incoming call thereby preventing the fax machine from automatically answering the incoming call. The incoming call, once answered is "read" for handshake signals to determine if the call is a fax call. If the call is determined to be a fax call, the fax machine is automatically activated by the present device through the generation of imitation "ring" signals which simulate an incoming call so that the facsimile machine answers the imitation "ring" signals. Once the fax machine answers the imitation "ring" signals means is provided for connecting the fax machine back with the single telephone line for fax communication.

3 Claims, 2 Drawing Sheets

DEDICATED LINE ELIMINATOR FOR FACSIMILE/TELEPHONE SYSTEMS

This is a continuation of application Ser. No. 482,200, filed Feb. 20, 1990 abandoned.

FIELD OF THE INVENTION

The present invention relates to devices of the type intended to be added to single line telephone systems to accommodate a facsimile (fax) machine. The invention is more directly related to automated control of incoming signals along the single telephone line for such telephone/facsimile machine systems.

BACKGROUND OF THE INVENTION

It is often desirable for small businesses (and others) who require only occasional use of a facsimile machine, to incorporate the machine with their already existing telephone line network without supplying it with a single dedicated line. In doing so, the business saves the cost of installation and service charges associated with a dedicated facsimile line.

A problem with such a shared line arrangement is that an incoming call cannot be identified as either a facsimile call or a voice call until it is answered by the facsimile machine or a person answers the connected telephone. The telephone "rings" the same in either case.

This inability to properly distinguish an incoming call prior to answering can lead to misplaced or unanswered incoming calls. For example, if a facsimile machine answers a voice call, the caller will become confused and possibly upset by the high pitch "handshake" signal transmitted from the facsimile machine. Likewise, if a person answers a facsimile call, the remote facsimile station will most likely abort transmission because it did not receive any return "handshake" signals. In either case, potentially important data transmission can be either lost or delayed, thus disrupting business transactions.

Facsimile machines are currently available with internal delaying circuitry which controls a delay period from the moment an incoming call is detected to when a facsimile machine answers the call. For example, the facsimile machine could answer an incoming call after a predetermined number of telephone rings, usually within the first ring. Upon answering any incoming call, voice or fax, a facsimile machine will immediately and continuously transmit return handshake signals along the single telephone line. If the incoming call happens to be a facsimile call from a remote facsimile station, the incoming handshake signals would be received by the local facsimile machine and the two machines would connect and begin data transmission. If however, the incoming call is a voice call, the facsimile machine would answer the call and begin transmitting return handshake signals for about 20 seconds. After not receiving the appropriate incoming handshake signals from the incoming voice call during this period, the facsimile machine would either disconnect the line or summon a person in the immediate area through the use of beeper, indicating a voice call. This situation causes inconvenience to the caller (incoming call) because he must listen to the outgoing handshake signals transmitted by the called facsimile station for about 20 seconds before any human is summoned to the telephone. He will most likely hang up.

Furthermore, after a facsimile machine answers a voice call, it could trigger an alarm which indicates a malfunction and, depending on the machine, could require resetting. If the facsimile machine requires resetting and no one is available to reset the machine, no future incoming facsimile calls will be received.

If an operator answers the facsimile machine and the incoming call is a voice call, the two parties will connect and communication can precede with no lost information. However, if an incoming call is a facsimile call and a human operator answers before the local facsimile machine, the remote facsimile station (calling) will not receive the important return handshake signals and will automatically disconnect after a short period of time. The remote station will have to try again to connect with the local facsimile machine.

In lieu of any practical solution, all known currently available facsimile machines which have this answering delay feature have answering priority over the telephone for all incoming calls. Apparently it is considered more important to successfully connect two facsimile machines and receive data, than possibly irritate a caller (voice) with handshake signals.

A similar inconvenience to a voice caller occurs when a voice call answering machine is connected to the fax/telephone shared line arrangement. After the above-mentioned 20 second period, the facsimile machine will summon a person from the immediate area or activate a connected voice answering machine.

Many aftermarket electronic devices have been made available in an effort to solve the abovementioned problems associated with sharing one telephone line with a facsimile machine and a telephone. These devices are connected to a portion of the telephone network and are generally concerned with answering an incoming call and thereafter determining the type of call, voice or fax. Some of these devices permit a human operator to interfere with the "handshake" procedure between two facsimile machines by answering an incoming facsimile call prior to a facsimile machine. With such devices, after hearing the incoming "handshake" signals from the remote facsimile station, the operator must push a "transfer button" on the device and hang up the phone before the incoming "handshake" signals automatically cease. If the operator fails to do this before the relatively short time period, the two facsimile machines will not connect and the incoming data will be lost.

OBJECTS OF THE INVENTION

It is an object of the present invention to provide a device which eliminates the need for a dedicated facsimile line and which overcomes the above-mentioned problems;

Another object of the invention is to provide a dedicated line eliminator with an incoming voice call priority allowing a person to answer the incoming call, fax or voice, and not interfere or disrupt the handshake procedure if it is a fax call.

Another object of the invention is to provide a dedicated line eliminator that can isolate the connected fax machine and, depending on the type of incoming call, imitate incoming "ring" signals and activate the isolated fax machine.

Yet another object of the invention is to provide a dedicated line eliminator that can accommodate the connection of a separate message machine for allowing incoming callers who do not have automatic-transmission fax machines to call ahead by voice and prepare for fax transmission using on-line decoder detection.

SUMMARY OF THE INVENTION

The present invention provides a device for use with shared-line telephone/facsimile machine systems. The device initially assumes an incoming call is a voice call (telephone priority) and provides sufficient time for someone to answer the phone before a connected facsimile machine, which has been "held in isolation" is summoned to answer the call. The invention isolates the facsimile machine and creates a delay period, three to seven rings for example, before allowing the facsimile machine to answer the call, thus allowing time for an operator or voice answering machine to answer the ca-11 and not cause any inconvenience to a caller.

Any unanswered incoming call will be "held" until the prescribed delay period ends. At that point, the call is automatically transferred to the waiting facsimile machine. After the delay period, the facsimile machine will proceed as if it were the first to receive the incoming call on the line. The transfer of the incoming facsimile call to the facsimile machine is automatic and remains within the time period during which incoming handshake signals can be "read" by the local facsimile machine.

If someone, or something such as a connected phone answering machine, answers the ringing phone during the three to seven ring delay period provided by the invention, one of two things will happen: either a voice will respond indicating a voice call and communication can continue, or the person (or thing) who answers will hear familiar incoming handshake signals. Once the incoming call is answered, the invention will be able to determine the type of call. Regardless of the remaining delay period, if incoming "handshake" signals are read, either the person who answered the phone or an answering machine is interrupted and the call automatically transferred to the waiting facsimile machine.

On the other hand, if an incoming call is a voice call and it is answered by a person or an answering machine, the invention will determine (when the call is answered) that the call is a non-facsimile call because no incoming "handshake" signals were detected. In this instance, the invention will not interfere with the voice conversation.

DETAILED DESCRIPTION OF THE PREFERRED EMBODIMENT

Figure 1:
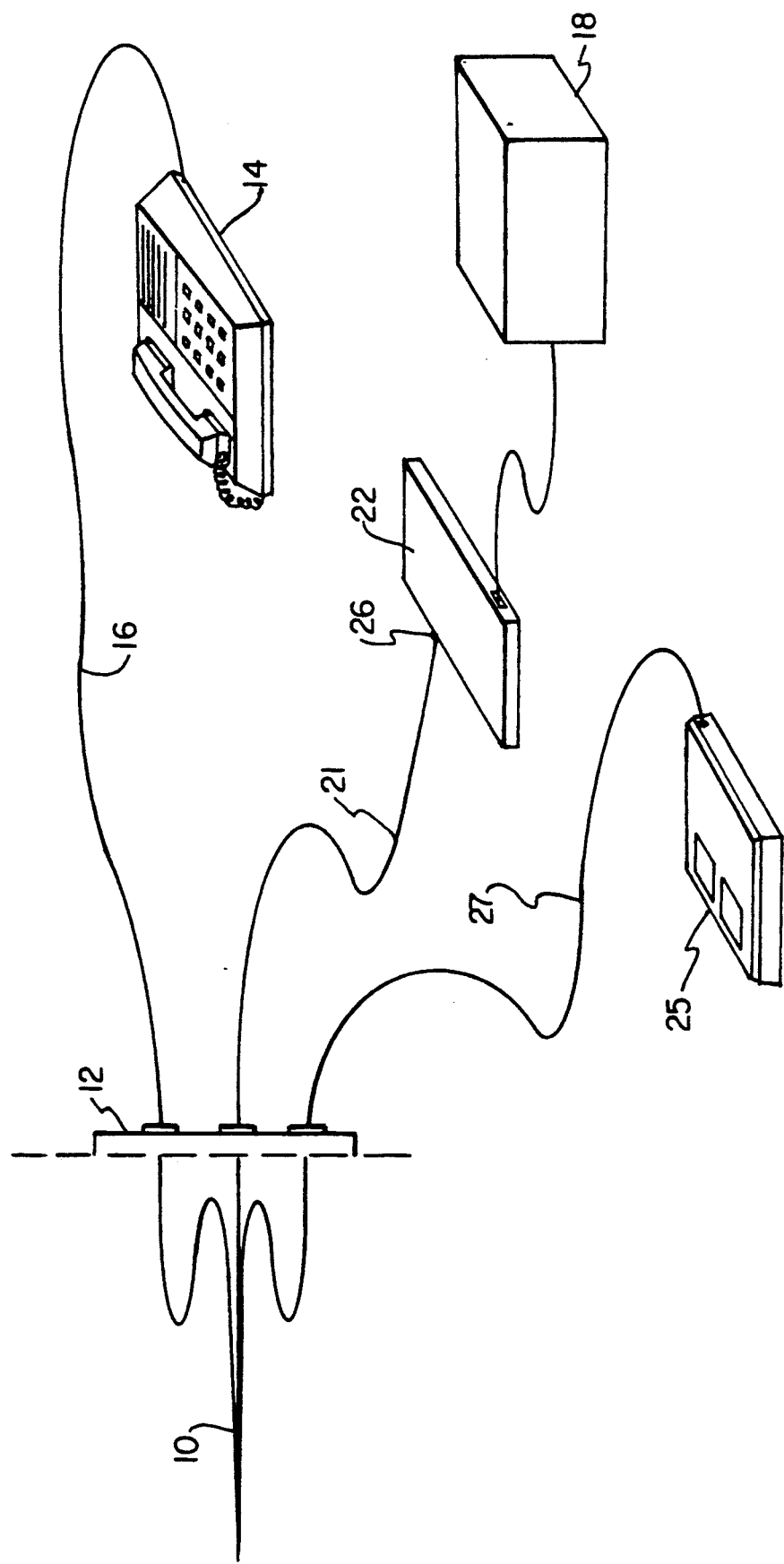
FIG. 1 is a conceptual block diagram showing a preferred arrangement of the present invention with a typical telephone/facsimile machine shared-line system.

FIG. 1 shows a typical shared-line telephone/facsimile machine system with the present invention installed. A standard telephone line 10 from the telephone line network enters the wall of a dwelling (represented by phantom lines) and terminates at a standard telephone line wall jack 12. In such applications where a telephone and a facsimile machine share a common telephone line, the wall jack 12 will generally have two female socket connections of the "USOC" variety which are both connected to the single telephone line 10. A conventional telephone 14 is connected to one socket of the wall jacket 12 through line 16 and a conventional facsimile machine 18 is connected to the other socket of the wall jack 12. The present invention represented by numeral 22 in FIG. 1 is preferably connected between the telephone wall jack 12 and the facsimile machine 18 such that line 20 from the facsimile machine 18 enters the circuit of the present invention 22 at connection 24 and line 21 from the wall jack 12 enters the circuit at the present invention 22 at connection 26.

Figure 2:
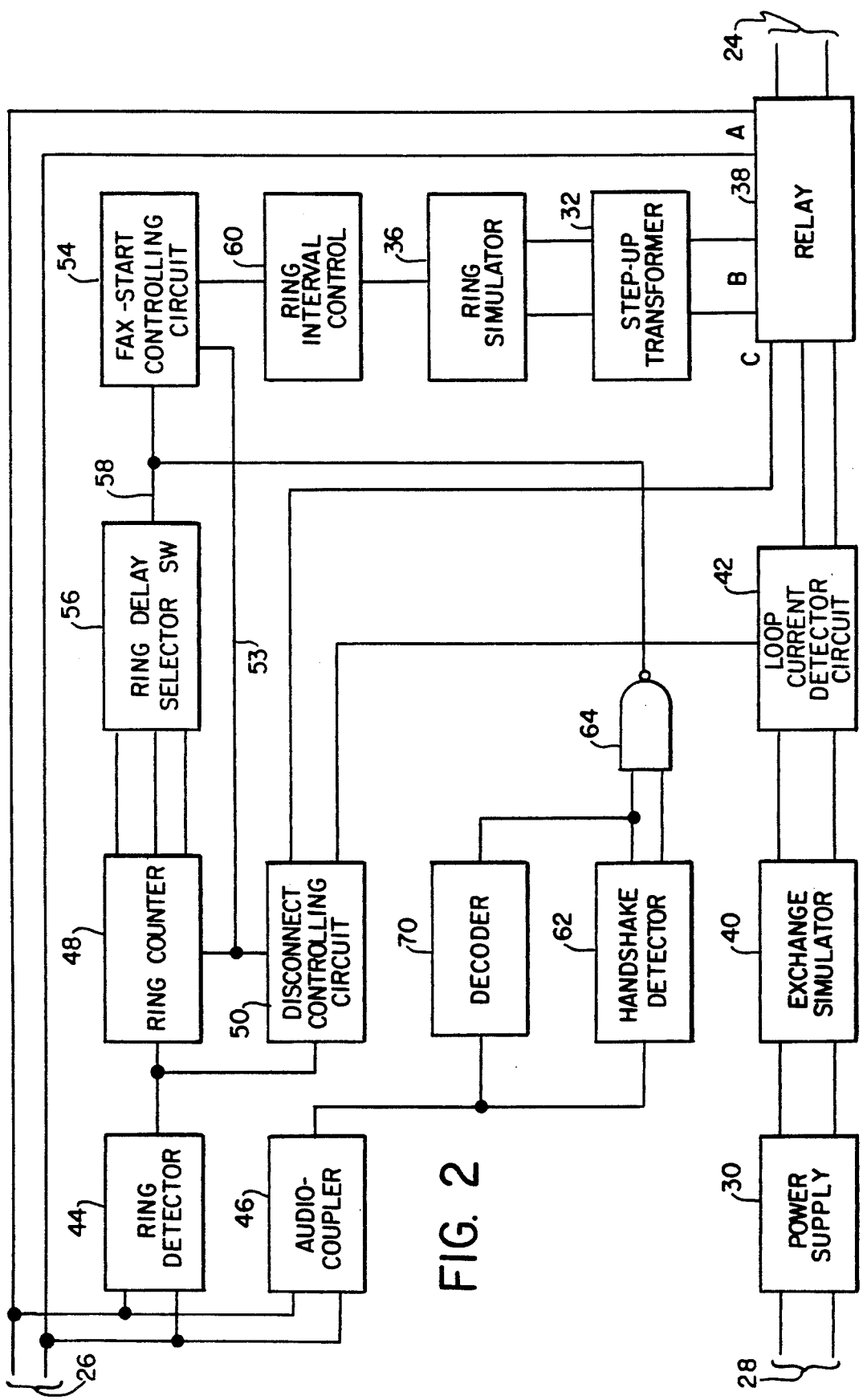
FIG. 2 is a block diagram of a preferred embodiment of the present invention.

Referring to FIG. 2, a block diagram schematic of one embodiment of the present invention is shown. The present invention preferably includes an input power supply of 12 volts AC, entering on lines 28. This 12 volt supply can be conventionally supplied through a step down transformer of the type which is integral with a plug connector for direct connection to a wall outlet (as shown in FIG. 1). The power input lines 28 are connected in parallel to an internal power supply 30. The internal power supply 30 supplies the operating power for all of the internal components hereinafter described (typically from 8 volts DC to 15 volts DC).

Power supply 30 supplies 8 volts DC to an exchange simulator 40. The exchange simulator is essentially a transformer that increases its 8 volt DC input to an 18 volt DC output. The purpose of the exchange simulator 40 is to simulate an on-line condition to the facsimile machine when the fax machine is otherwise disconnected from the telephone line 21 by a relay, as further described below. The 18 volts D.C. output of the simulator 40 is supplied to a loop current detector circuit 42. The output of the loop current detector circuit 42 is connected to output connector 24 and to the fax machine 18. The loop current detector circuit 42 detects any voltage drop across the telephone line 21 (and 10), specifically caused when an incoming call is answered by the receiver of the telephone 14 being picked up or by an answering machine 25, connected to the incoming telephone line, in parallel by line 27.

A relay 38 is located between the loop current detector circuit 42 and the fax machine 18 for controlling which line is connected to the fax machine, either an outside actual line or an internally generated simulated line, as further described below. The relay 38 is controlled by a disconnect controlling circuit 50 (described later). The loop current detector circuit 42 is connected to the disconnect controlling circuit 50 by line 43.

The purpose of the loop current detector circuit 42, the relay 38, the exchange simulator 40 and the disconnect controlling circuit is to selectively isolate the connected fax machine from the actual line 21 and while isolated to provide the fax machine with a simulated input so that an incoming call can be answered by another device such as a telephone receiver or an answering machine without signaling or otherwise activating the isolated fax machine. The exchange simulator 40 therefore allows the fax machine 18 to "think" nothing has happened and there is no incoming call, fax or voice. It also provides a constant voltage across the input of the fax machine 18 so that when it is determined that the incoming call is a fax call (as later described in detail) and the fax machine answers simulated "ring" signals, the loop current detector circuit 42 will have a voltage drop that it can detect.

The relay 38 in this preferred embodiment is a standard double-throw relay. A first throw connects both the exchange simulator 40 (via the loop current detector circuit 42) and an input carrying simulated "ring" signals (as described below) from a step-up transformer 32 to the fax machine 18. The relay 38 in the first throw position prevents the fax machine 18 from receiving any information from the actual line 21. A second throw of the relay 38 disconnects the circuit connections of the first throw and connects the input fax lines to the actual line 21 for data reception or transmission. The relay 38 preferably rests in the second throw position and must be energized to the first throw position.

A conventional telephone jack 24 is preferably used to connect the facsimile machine to the present invention. The jack 24 is connected to the relay 38.

The incoming "outside" line 21 enters the present device at jack 26 and is internally connected, in parallel, to three main components including a ring detector 44, an audio coupler 46 and, as mentioned above, the relay 38. The ring detector 44 can be a conventional detection circuit for detecting standard telephone "ring" signals on a line. The circuit is generally available in I.C. chip form. A standard 4N25 integrated circuit isolator device can be used. The RING DETECTOR 44 detects high voltage A.C. across the incoming line 21, indicating an incoming call. The audio coupler 46 can be a standard off-the-shelf audio coupler (also as an i.C. chip) and is used to couple the signals of the incoming line to both a commonly known "Handshake" detector circuit 62 and a standard decoder circuit 70 (also available in the preferred i.C. chip format. The handshake detector circuit 62 in this preferred embodiment includes two LM567 gates, which are well known tone decoders (other equivalent decoders and decoder circuits could be implemented in a manner well known in the art). The tone decoders are set to detect the frequencies of 1100 and 1850 Hz. The bulk of today's fax machines send their CNG handshake signals at one of these two frequencies.

Inverted AND gate 64 connects the output of both the handshake detector circuit 62 and the decoder circuit 70 with the input of the facsimile machine connect reset and ring generator start circuit 54.

The handshake detector circuit 62 detects any handshake signals (codes) on a possible incoming facsimile call after the call is answered by either a human operator or an answering machine (i.e. line voltage drop detected). If an incoming facsimile call is answered, the handshake detector circuit 62 will detect the incoming handshake signals and will interrupt all other procedures including phone answering machines and anybody who picked up the telephone receiver, to re-connect a disconnected facsimile machine, returning it on-line. The facsimile machine can only receive incoming information from incoming calls when it is on-line with the telephone network.

A known ring counter circuit 48 and the disconnect controlling circuit 50 are connected, in parallel, to the ring detector circuit 44. The disconnect controlling circuit 50 includes a conventional sequential circuit element, preferably a j-k flip-flop, like the SN74LS73 from Texas Instruments, Inc. In the preferred embodiment of this invention, the disconnect controlling circuit 50 also includes a timing sub-circuit for automatically triggering the j-k flip-flop after a predetermined time starting from the detection of the first incoming "ring" signal. An output of the disconnect controlling circuit 50 is connected to the relay 38, as described above, and controls its operation.

The ring counter 48 counts the number of detected incoming "ring" signals and, depending on the setting of a selector switch 56 will output an enabling signal along line 58 after either 3, 5 or 7 counted "rings". A standard CD4017 CMOS counter can be used.

Line 58 from the ring counter 48 and the selector switch 56 is connected to the input of a fax-start control circuit 54 which can be a standard application of a CD4013 timer. The fax-start control circuit 54 initiates the procedure for generating simulated "ring" signals to be sent to the isolated fax machine, as described below. Also connected to the fax-start control circuit 54 is the output of the handshake detector circuit 62. The fax-start control circuit 54 is enabled only if the incoming call was not answered and the preselected number of "rings" were detected by the ring counter 48, or after something or someone answers the incoming call and the handshake detector circuit 62 detects handshake signals, indicating a fax call.

The fax-start control, circuit 54 is also connected to the disconnect controlling circuit 50 and ring counter 48 for the purpose of resetting the ring counter 48, preparing it for any future incoming calls. The disconnect controlling circuit 50 is also connected via line 52 to the ring counter 48 so that after the prescribed delay period of 90 seconds, the disconnect controlling circuit 50 can reset the ring counter 48. This arrangement is necessary because if the incoming call is a voice call and it is answered before the preset number of "rings" is counted by the ring counter 48, the fax-start control circuit 54 will not be enabled and therefore could not reset the ring counter 48.

The output of the fax-start control circuit 54 is connected to a ring-interval control circuit 60 which is a known application of a LM555 timer I.C. chip for the purpose of creating the proper "ring" signal intervals. The standard "ring" interval for the United States telephone system is a cycle of two seconds of "ringing" at four second intervals.

The output signal of the ring interval control circuit 60 (following its proper interval cycle) is sent to a ring simulator circuit 36 which can be suitable standard oscillator circuit. The oscillator circuit oscillates the two second "ring" signal at a predetermined frequency, which is 20 hz. in this preferred embodiment. The frequency of 20 hz. has been chosen because all fax machines, new, old, expensive and cheap respond to inputted "ring" signals oscillating at 20 hz., whereas only certain older fax machines recognize a 60 hz "ring" signal.

The output of the ring simulator is a simulated standard telephone "ring" signal, similar in frequency and on/off "ring" cycle except that the peak-to-peak voltage is low and needs to be stepped-up before it is sent to an isolated fax machine. The output of the ring simulator 36 is therefore sent first to a step-up transformer 32. The transformer 32 can be any standard transformer, considering the other components of the circuit. In this preferred embodiment, the transformer 32 must be specifically designed to receive and step-up input signals of 20 hz. to the proper voltage of telephone "ring" signals.

The output of the step-up transformer 32 is connected, to the relay 38. The connection of the transformer 32 with the relay 38 allows the simulated "ring" signals to connect with the input of the fax machine 18.

The facsimile machine will read the incoming simulated "ring" signals and will answer the incoming call as if it were first being received from the telephone network.

In operation, for example, an incoming call ("ring" signals) traveling along line 10 reaches the input telephone jack 12 of an office and is sent to both a telephone 14 along line 16 and the input of the present invention 22 along line 21. The telephone begins to "ring" audibly. The "ring" signal simultaneously reaches the ring detector 44 and the audio coupler 46. The ring detector 44 enables the ring counter 48 which begins counting the incoming "rings". The ring detector 44 also enables the timing circuit portion of the disconnect controlling circuit 50 which begins a 90 second count, and causes the disconnect controlling circuit 50 to send an enable signal along line 51 to the relay 38. Upon receiving this enabling signal, the relay 38 energizes and switches from the second throw position to its first throw position, which disconnects the fax machine from the actual line 21 and connects it to the exchange simulator 40. The exchange simulator 40 simulates an on-line condition for the fax machine while the status of the incoming call is determined. It is necessary to pull the fax from the actual line 21, otherwise the it will answer the call regardless of the status (i.e., voice or fax).

Both the decoder 70 and the handshake detector 62 receive line signals from the audio coupler 46. The decoder 70 constantly "reads" the line for its particular code signal. The handshake detector 62 "reads" the line for any handshake signals entering on the line. No such signals will be present on the line, however, until the incoming call is answered.

In this example, the selector switch 56, of the ring counter 48 is set for a 5 "ring" delay. The purpose of the delay is to provide a local person to answer the incoming call, expecting a voice call, instead of the fax machine automatically answering every incoming call, fax or voice. If the person answers the phone within the 5 "ring" delay time and the incoming call is voice, then all is well and the fax machine will never be summoned (or activated). In such instance, at the end of the 90 second delay period as measured by the timing circuit portion of the disconnect controlling circuit 50, the disconnect controlling circuit 50 will be directed to de-energize relay 38, putting the relay 38 back to its second throw position which connects the fax machine back on-line 21 so that it is ready for future calls. If, however, no one answers the incoming call within the 5 "ring" delay period, the present circuit will automatically initiate the transfer of the incoming call to the fax machine 18 which will be summoned, as described below.

If the call is a fax call and is answered by a person during the 5 "ring" delay period, the handshake detector 62 will automatically detect the incoming CNG handshake signals, of either frequency. The handshake detector 62 will then send an enable signal to the fax-start control circuit 54 which will reset (along line 53) the ring counter 48, preparing it for any future calls, and will initiate the generation of simulating "rings" for transmission to the local machine 18. The ring interval control circuit 60 is first enabled, then the ring simulator 36 and finally the resulting simulating "ring" signal is stepped-up by transformer 32 and sent to the fax machine 18 through relay 38 (in its first throw position).

When the fax machine 18 receives the incoming (simulated) "ring" signals it will answer them, not "realizing" that the incoming call has already been answered (in this case). The instant the fax machine 18 answers the simulated "ring" signals, the voltage across line 24 will drop. The drop in voltage will be detected by the loop current detector 42 which will immediately send a "disconnect" signal to the disconnect controlling circuit 50 directing the disconnect controlling circuit 50 to de-energize relay 38 back to its second throw position. The de-energizing of relay 38 will switch the fax machine 18 back on-line 21 so that the calling fax machine and the local fax machine 18 can communicate in their usual manner (i.e., handshake, then transmit and receive data).

The present invention therefore places initial priority of any incoming call to the telephone. If it is answered within the delay period set (3, 5, 7 rings) and the call is a fax call, the present device 22, as described above will detect the fax-status of the call and will switch the priority of the call to the fax machine 18.

The decoder 70 of the present invention is used in a particular application where the fax machine 18 is used in conjunction with a typical telephone answering machine 19, also connected to the single telephone line 10, as shown in FIG. 1. This particular application of decoder 70 is useful in the following situation.

If a distant fax station has a non-automatic fax machine on a non-dedicated line, then in order for that remote station to transmit data to a local fax machine, a person at the remote station must first call the local station and state that he would like to send a fax transmission. The people involved set up their respective fax machines to transmit and receive, substituting the handshake procedure of the automatic calling fax machines.

In this situation, if no person is present at the local station and the distant person calls the local fax machine connected to the present device and including a telephone and answering machine arrangement (as shown in FIG. 1), it would be desirable for the remote caller to still be able to communicate with the local fax machine 18 to control its start-up. The present invention provides for such communication by detecting certain signals on the line generated by prescribed touch-tone keys of the distant caller's telephone. This can be accomplished using an LM204 to detect DTMF tones. The LM204 is a standard commonly available integrated circuit that can detect and decide DTMF tone. This device will connect in series with audio coupler 46, which is a standard audio transformer that meets FCC requirements for telephone line audio interfaces. As described above, the output of the audio coupler 46 is received by both the decoder 70 and the handshake detector 62.

In yet another situation a person at a remote station would like to transmit a facsimile to a local station which has only one incoming telephone line shared with a fax machine, but would first like to confirm or obtain the correct facsimile dialing number prior to sending the facsimile. If the distant person calls the local station, but no one is present to answer the phone at the local station, no facsimile would normally be sent.

The present invention provides for an answering machine to answer any incoming calls during the initial 3, 5, or 7 "ring" delay before a connected (in a shared-line arrangement) fax machine automatically answers the incoming call. The circuitry of the present invention, as shown in FIG. 2, includes a decoder circuit which is in itself known. As described above, the purpose of the decoder 70 is to continuously "read" the incoming signals along the line 21 and to either connect the fax machine to the incoming line or disconnect the line altogether when it detects a predetermined touch-tone signal, such as the line signal which corresponds to the pound key "#", or the asterisk "*" key of a standard touch-tone telephone handset. The decoder 70 will operate with an answering machine 19 which is connected to the single telephone line 10. A distant person calling an unattended local station will automatically activate a connected answering machine which will supply the remote operator with a message such as "if you would like to leave a message, do so after the beep.-..if you would like to send a facsimile to this station, press the "*" key on your touch-tone handset after the beep. You will have one minute to start fax transmission after the beep. Have a nice day". If the decoder 70 detects the "*" signal from the incoming line 10 it will deactivate the phone answering machine and activate any standard timer circuit for one minute (for example) before sending a signal, via the handshake detector circuit 62, to the fax-start control circuit 54. The fax will begin its "start" cycle after the one minute delay to receive the incoming facsimile data.

If no encoded signal is detected, the decoder 70 will not deactivate the phone answering machine, thereby facilitating the recording of a voice message. In such instance, no start signal will be sent to either the one minute timer or the fax-start control circuit 54.

In another embodiment of the present invention, the entire circuit, as represented in FIG. 2 and where applicable is integrated in a single I.C. chip, thereby minimizing the overall size of the resulting product.

What is claimed is:

1. An electronic device for controlling the operation of a facsimile machine and a telephone which are both connected to a single telephone line, the device being located between the facsimile machine and the telephone line such than an incoming call, either a fax call or a voice call, will activate both the electronic device and the telephone, said electronic device comprising:

means for detecting said incoming call;
   means for disconnecting said facsimile machine from said telephone line for a predetermined period of time in response to said detection means detecting said incoming call without affecting the connection of said telephone to said telephone line, thereby preventing said facsimile machine from automatically answering said incoming call and allowing a person to answer said incoming call with said telephone;
   means for determining whether the incoming call, once answered, is fax call, intended for said facsimile machine;
   means for activating said disconnected facsimile machine by generating imitation "ring" signals which simulate an incoming call so that said facsimile machine answers said imitation "ring" signals, said activating means being responsive to said determining means determining said incoming call is a fax call;
   means for detecting when said facsimile machine answers said imitation "ring" signals; and
   means for connecting said facsimile machine back with said telephone line so that said fax call is received by said facsimile machine.

2. A method for directing incoming calls from s single input telephone line to either a facsimile machine or a telephone having a connection to said telephone line, wherein said incoming calls include a "ring" signal followed by either facsimile data or voice data depending on the intended destination, the steps of said method comprising:

detecting said "ring" signal of an incoming call;
   electrically disconnecting said facsimile machine from said input telephone line without affecting the connection of the telephone to the telephone line, said step of electrically disconnecting being responsive to detection of said "ring" signal, an incoming call on telephone line causing said telephone to "ring" and providing an opportunity for person in the vicinity of the telephone to answer said incoming call by bringing said telephone to an off-hook state;
   determining whether said incoming call, upon being answered, includes facsimile data by detecting handshake signals;
   electrically reconnecting said facsimile machine to said input telephone line if said predetermined period has elapsed and said incoming call remains unanswered or in response to detecting said handshake signals after said incoming call in answered, wherein said reconnecting step includes:
   generating simulated "ring" signals to said facsimile machine, thereby activating said facsimile machine to answer said simulated "ring" signals and receive said incoming facsimile data.

3. A method for directing incoming calls from a single telephone line to either a data device or a telephone, said data device being of the type utilizing handshake signals to establish a connection, incoming calls including a "ring" signal followed by either data or voice information depending on the intended destination, said method comprising the steps of:

providing a normal connection between said telephone and said telephone line;
   providing an electrical connection between said data device and said telephone line;
   in response to a "ring" signal on said telephone line, electrically disconnecting said data device therefrom; and
   upon an incoming call remaining unanswered for a predefined period of time or in response to the appearance of handshake signals on the telephone line, performing the following additional steps:
   reconnecting said data device to said telephone line; and
   providing a simulated "ring" signal to said data device so that it may answer the same in its usual manner and receive data coming in on said telephone line.

* * * * *